United States Patent [19]

Morimoto et al.

[11] Patent Number: 4,733,368
[45] Date of Patent: Mar. 22, 1988

[54] ELECTRONIC DEVICE FOR BIDIRECTIONAL TRANSLATION

[75] Inventors: Masafumi Morimoto, Yamatokoriyama; Kunio Yoshida, Nara; Tosaku Nakanishi, Nara, all of Japan

[73] Assignee: Sharp Kabushiki Kaisha, Osaka, Japan

[21] Appl. No.: 885,822

[22] Filed: Jul. 15, 1986

Related U.S. Application Data

[62] Division of Ser. No. 253,663, Apr. 13, 1981, Pat. No. 4,623,985.

[30] Foreign Application Priority Data

Apr. 15, 1980 [JP] Japan .................................. 55-51064
Apr. 15, 1980 [JP] Japan .................................. 55-51065

[51] Int. Cl.$^4$ .............................................. G06F 13/38
[52] U.S. Cl. ...................................... 364/900; 364/419
[58] Field of Search ... 364/200 MS File, 900 MS File, 364/419

[56] References Cited

U.S. PATENT DOCUMENTS

| | | | |
|---|---|---|---|
| 4,158,236 | 6/1979 | Levy | 364/900 |
| 4,218,760 | 8/1980 | Levy | 364/900 |
| 4,328,562 | 5/1982 | Hashimoto et al. | 364/900 |
| 4,381,551 | 4/1983 | Kanou et al. | 364/900 |

Primary Examiner—Raulfe B. Zache
Assistant Examiner—Michael J. Ure
Attorney, Agent, or Firm—Birch, Stewart, Kolasch & Birch

[57] ABSTRACT

An electronic translator comprises an input device for entering a first word or words, a first memory circuit for storing the first words, a second memory circuit for storing second words equivalent to the first words, an access circuit for addressing the memory circuits to cause retrieval of the first word or words, or alternately the second word or words, and a control circuit for controlling activation of the access circuit. There may be additionally provided a holding circuit for holding one or more of the first words without translation thereof.

10 Claims, 15 Drawing Figures

| KEY OPERATION | TONGNE ▲MOTHER ▼FOREIGN | | | INPUT BUFFER (INDICATION) | SIDETRACK BUFFER |
|---|---|---|---|---|---|
| | ENG | GER | JPN | | |
| COFFEE | ▲ | | ▼ | COFFEE | |
| [TRL] | ▲ | | ▼ | コーヒー | COFFEE |
| [TRL] | ▲ | | ▼ | COFFEE | コーヒー |
| [LNG] | | ▼ | ▲ | COFFEE | コーヒー |
| [TRL] | | ▼ | ▲ | KAFFEE | COFFEE |
| [TRL] | | ▼ | ▲ | コーヒー | KAFFEE |

| KEY OPERATION | TONGNE ▲MOTHER ▼FOREIGN | | | INPUT BUFFER (INDICATION) | SIDETRACK BUFFER |
|---|---|---|---|---|---|
| | ENG | GER | JPN | | |
| COFFEE | ▲ | | ▼ | COFFEE | |
| TRL | ▲ | | ▼ | コーヒー | COFFEE |
| TRL | ▲ | | ▼ | COFFEE | コーヒー |
| LNG | | ▼ | ▲ | COFFEE | コーヒー |
| TRL | | ▼ | ▲ | KAFFEE | COFFEE |
| TRL | | ▼ | ▲ | コーヒー | KAFFEE |

FIG.7

| 1 | 1 1 1 1 0 1 0 | ( )1 CODE |
|---|---|---|
| 0 | ミ | |
| 0 | ル | |
| 0 | ク | |
| 1 | コ | |
| 1 | モ | |
| 0 | ウ | バルク) ヲ |
| 0 | ス | モウスコシ クダサイ |
| 0 | コ | |
| 0 | シ | |
| 1 | ク | |
| 0 | ダ" | |
| 0 | サ | |
| 0 | イ | |
| 1 | 1 1 1 1 1 0 | SEPARATION CODE |

| | | |
|---|---|---|
| 1 | GO | ⎫ |
| 0 | O | ⎪ |
| 0 | D | ⎪ |
| 1 | MO | ⎬ GOOD MORNING |
| 0 | R | ⎪ |
| 0 | NI | ⎪ |
| 0 | NG | ⎭ |
| 1 | 1 1 1 1 1 1 0 | ← SEPARATION CODE(·) |
| 1 | HO | ⎫ |
| 0 | W | ⎪ |
| 1 | A | ⎪ |
| 0 | RE | ⎬ HOW ARE YOU? |
| 1 | Y | ⎪ |
| 0 | O | ⎪ |
| 0 | U | ⎭ |
| 1 | 1 1 1 1 1 0 0 | ← SEPARATION CODE(?) |
| 1 | 1 1 1 1 1 0 1 | ← ADDRESS |
| | (H) | ⎫ MEMORIZED CODE |
| | (L) | ⎬ LEADING ADDRESS |
| 1 | 1 1 1 1 1 1 0 | ← SEPARATION CODE(·) |
| 1 | GO | ⎫ |
| 0 | O | ⎪ |
| 0 | D | ⎪ |
| 1 | L | ⎬ GOOD LUCK. |
| 0 | U | ⎪ |
| 0 | CK | ⎭ |
| 1 | 1 1 1 1 1 1 0 | ← SEPARATION CODE(·) |
| 1 | 1 1 1 1 1 1 1 | ← CATEGORY SEPARATION CODE |
| 1 | W | |
| 0 | HA | |
| 0 | T | |

| | | |
|---|---|---|
| 1 | I | ⎫ |
| 0 | S | ⎪ |
| 1 | TH | ⎬ WHAT IS THIS |
| 0 | I | ⎪ |
| 0 | S | ⎭ |
| 1 | 1 1 1 1 1 0 0 | ← SEPARATION CODE(?) |
| 1 | A | ⎫ |
| 1 | LI | ⎪ |
| 0 | T | ⎪ |
| 0 | T | ⎪ |
| 0 | LE | ⎬ A LITTLE MORE (MILK) PLEASE. |
| 1 | MO | ⎪ |
| 0 | RE | ⎪ |
| 1 | 1 1 1 0 1 0 | ← ( )1 CODE |
| 0 | MI | |
| 0 | L | |
| 0 | K | |
| 1 | P | |
| 0 | LE | |
| 0 | A | |
| 0 | SE | |
| 1 | 1 1 1 1 1 1 0 | ← SEPARATION CODE(·) |
| 1 | I | ⎫ |
| 1 | WA | ⎪ |
| 0 | NT | ⎪ |
| 1 | 1 1 1 1 0 1 0 | ← ( )1 CODE |
| 0 | Z | |
| 1 | TI | |
| 0 | CK | ⎬ I WANT(Z) TICKETS TO (TOKYO). |
| 0 | E | |
| 0 | T | |
| 0 | S | |
| 1 | TO | |
| 1 | 1 1 1 1 0 1 1 | ← ( )2 CODE |
| 0 | TO | |
| 0 | K | |
| 0 | Y | |
| 0 | O | |
| 1 | 1 1 1 1 1 1 0 | |

| H \ L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A | B | C | D | E | F | G | H | I | J | K | L | M | N | O | P |
| 1 | Q | R | S | T | U | V | W | X | Y | Z | | | | | | |
| 2 | AN | BA | BE | BO | BU | CA | CH | CK | CL | COM | CON | CO | DA | DE | DI | DO |
| 3 | EN | EX | FA | FE | FI | FO | FUL | GE | GH | GO | HA | HE | HI | HO | IN | KE |
| 4 | KI | LA | LE | LI | LO | LY | MA | ME | MI | MO | MU | ND | NE | NG | NI | NO |
| 5 | NT | ON | PA | PE | PI | PO | PU | RA | RE | RI | RO | SA | SE | SH | SI | SO |
| 6 | ST | SU | TA | TE | TH | TI | TO | TU | TY | UN | VE | VI | WA | WE | WI | WO |
| 7 | $C_0$ | $C_1$ | $C_2$ | $C_3$ | $C_4$ | $C_5$ | $C_6$ | $C_7$ | $C_8$ | $C_9$ | $C_A$ | $C_B$ | $C_C$ | $C_D$ | $C_E$ | $C_F$ |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | $C_6$ | | | |
| D | | | | | | | | | | | | | | | | |
| E | | | | | | | | | | | | | | | | |
| F | | | | | | | | | | | | | | | | $C_5$ |

{ CODE ASSIGNABLE LOCATION FOR LETTERS, SYMBOLS, FIGURES AND CONTROL CODES }

FIG. 9

| BIT 8 7 6 5 4 3 2 1 | |
|---|---|
| 1 | A |
| 1 | N |
| 0 | AN |
| 1 | B |
| 1 | A |
| 0 | BA |
| 1 | B |
| 1 | E |
| 0 | BE |
| 1 | B |
| 1 | O |
| 0 | BO |
| 1 | B |
| 1 | U |
| 0 | BU |
| 1 | C |
| 1 | A |
| 0 | CA |
| 1 | C |
| 1 | H |
| 0 | CH |
| 1 | C |
| 1 | K |
| 0 | CK |
| 1 | C |
| 1 | L |
| 0 | CL |
| 1 | C |
| 1 | O |
| 1 | M |
| 0 | COM |
| 1 | C |
| 1 | O |
| 1 | N |
| 0 | CON |
| 1 | C |

| | |
|---|---|
| 1 | T |
| 1 | H |
| 0 | TH |
| 1 | T |
| 1 | I |
| 0 | TI |
| 1 | T |
| 1 | O |
| 0 | TO |
| 1 | T |
| 1 | U |
| 0 | TU |
| 1 | T |
| 1 | Y |
| 0 | TY |
| 1 | U |
| 1 | N |
| 0 | UN |
| 1 | V |
| 1 | E |
| 0 | VE |
| 1 | V |
| 1 | I |
| 0 | VI |
| 1 | W |
| 1 | A |
| 0 | WA |
| 1 | W |
| 1 | E |
| 0 | WE |
| 1 | W |
| 1 | I |
| 0 | WI |
| 1 | W |
| 1 | O |
| 0 | WO |
| 1 1 1 1 1 1 1 1 | ← COMPRESSION TABLE END CODE |

FIG.10

ELECTRONIC DEVICE FOR BIDIRECTIONAL TRANSLATION

This is a division of application Ser. No. 253,663, filed Apr. 13, 1981, now U.S. Pat. No. 4,623,985.

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional types of electronic devices in that the former is of a unique structure which provides for efficient and rapid retrieval of word information stored in a memory.

Translation can be performed between a first tongue or language, say, the mother tongue and a second tongue, say, the foreign tongue. For translation from the first tongue to the second tongue, a conventional translator requires entry of a word in the first tongue. In addition, for translation from the second tongue to the first tongue, a conventional translator requires entry of a word in the second tongue.

Therefore, it is desired to provide bidirectional translation between an original word in one language and the equivalent word in a second language merely with entry of the original word and without entry of the equivalent word.

SUMMARY OF THE INVENTION

Accordingly, it is an object of the present invention to provide an improved electronic translator comprising a bidirectional translation enabling means for obtaining bidirectional translation between an original word and an equivalent or translated word merely with entry of the original word and without entry of the equivalent word.

It is another object of the present invention to provie an improved electronic translator comprising means for retaining an entered word without translation thereof if entered word is not stored in a memory within the translator.

Briefly described, an eletronic translator of the present invention comprises an input device for entering a first word or words, a first memory circuit for storing a plurality of first words, a second memory circuit for storing second words equivalent to the fist words, an access circuit for addressing the memory circuits to cause retrieval of the first word or words, or otherwise the second word or words, and a control circuit for controlling activation of the access circuit. There may be additionally provided a holding circuit for holding the first word or words without translation.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 7 shows a table representing operation by the flow chart of FIG. 6;

FIGS. 8(a) through 8(d) show detailed formats representing sentences of the format of FIG. 4;

FIG. 9 shows a graph representing letter codes, compression codes, and control codes used for the word data;

FIG. 10 shows a detailed format of the compression table provided for the format of FIG. 4.

DESCRIPTION OF THE INVENTION

First of all, any languages can be applied to an electronic translator of the present invention. An input word is spelled in a specific language to obtain an equivalent word, or a translated word spelled in a different language corresponding thereto. The the languages can be freely selected.

Figure 1:
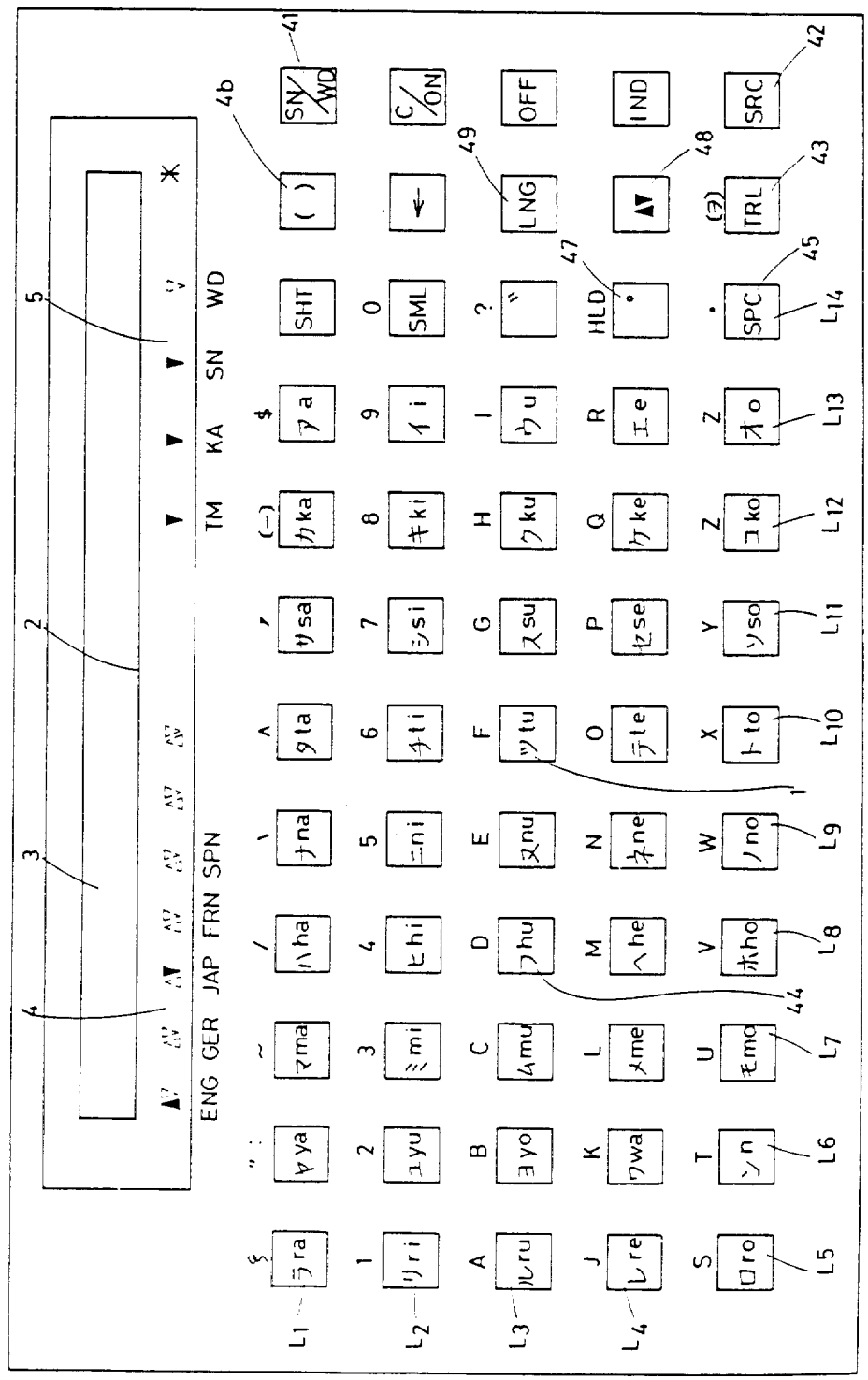
FIG. 1 shows a plan view of an electronic translator according to the present invention.

Referring now to FIG. 1, there is illustrated an electronic translator according to the present invention. The translator comprises a keyboard 1 containing a Japanese syllabery keyboard, an alphabetical keyboard, a symbol keyboard, and a functional keyboard, an indicator 2 including a character indicator 3, a kind of tongue indicator 4 and a symbol indicator 5.

The character display 3 shows characters processed by this translator. The kind of tongue indicator 4 shows symbols used for representing the kind of the mother tongue and the foreign tongue processed by the translator. The symbol indicator 5 shows symbols used for indicating operational conditions in this translator.

Figure 2:
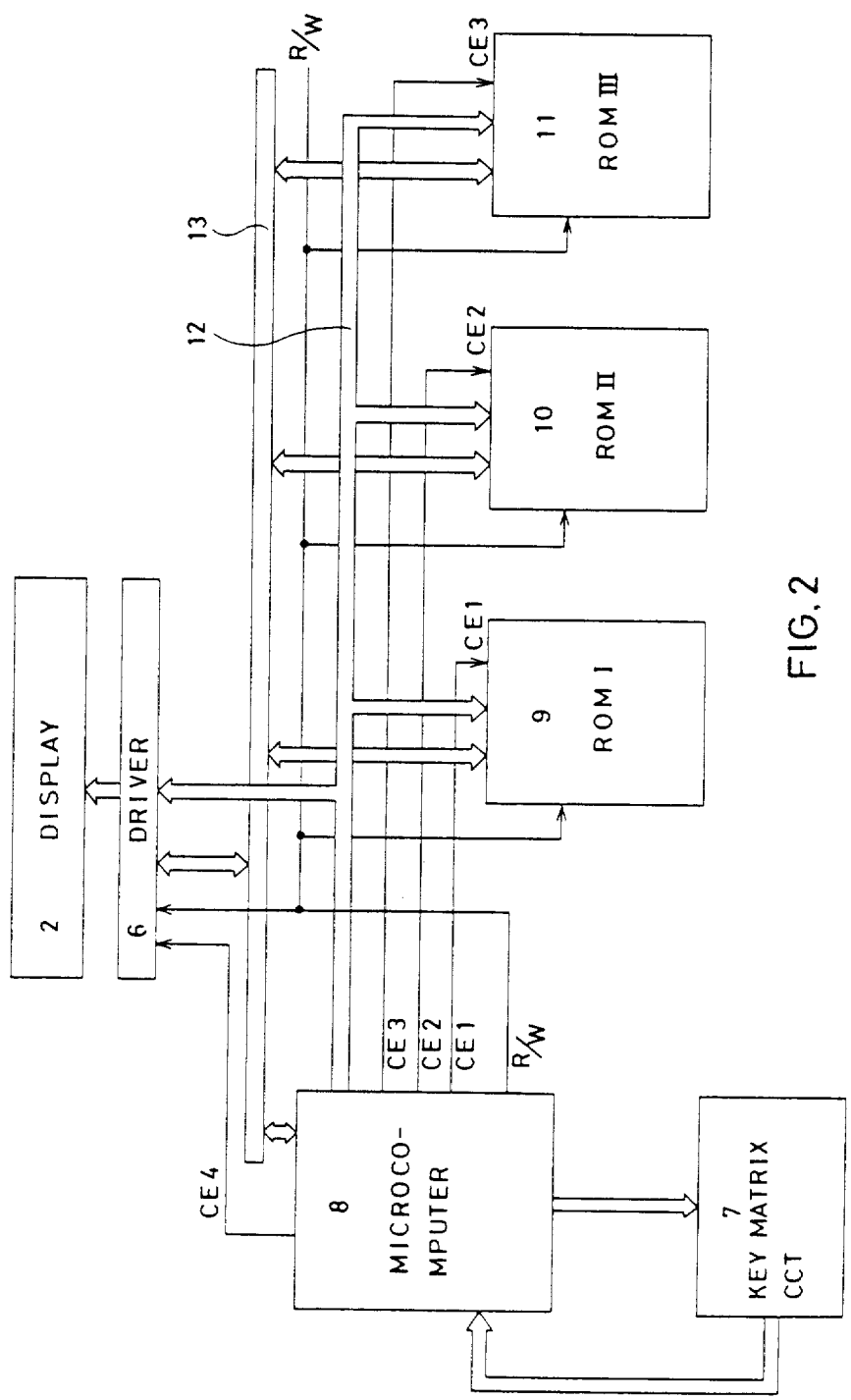
FIG. 2 is a diagram of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions as the keyboard 1 of FIG. 1. The circuit 7 is connected to terminals of the microcomputer 8 for developing key strobe signals and key input signals. each of the ROMs 9 to 11 contains words and/or sentences used by the translator.

According to a preferable example of the present invention, each of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator for exchange purposes. However, each of the ROM II 10 and the ROM III 11 can be removed from the translator and replaced by another type of ROM as a module.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting read or write operation.

FIG. 3(a) shows a block diagram of the microcomputer 8 of FIG. 2. An instruction ROM 14 stores a number of kinds of instructions each of which is for a specific operation by the translator and is, preferably, in coded format. As the address of a ROM address register 15 is in turn advanced, the ROM 14 provides a specific kind of instruction. The specific instruction is applied to a CPU 16 so that the CPU 16 provides its selected operation.

The CPU 16 comprises a control logic 17, a logic calculator 18, and an accumulator 19. Inner data bus is indicated by numeral 20. Data RAM 21 is provided for preliminarily containing data used for the translator and for functioning as a conditional flip flop used for a branch in a program operation. Data from the CPU 16 are stored in a specific location of the data RAM 21 which is selected by a RAM address register 22. The data stored in such a location of the RAM 21 are developed to the CPU 16.

Numeral 23 represents an output buffer register for outputting key strobe signals KS entered to the key matrix circuit 7 so that the output of this circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to select, increment or decrement a certain address is carried out by the CPU 16. Since the CPU 16 is coupled to the data bus 13 as shown in FIG. 2, transmission of the data between the CPU 16 and the external memory is conducted by the data bus 13. Direction of transmission of the data between them is defined with the read write signal R/W.

Each of flip flop circuits 25 to 28 is set or reset by a control logic 29. The control logic 29 is controlled by the CPU 16. The output of the respective flip flops 25 to 28 is chip selection signals $CE_1$ to $CE_4$.

FIG. 3(b) shows a block diagram of the driver 6 of FIG. 2. According to a preferable form of the present invention, the indicator 2 comprises a liquid crystal display. The character indicator 3 is formed as a 5×7 dot (segment) matrix for each digit. Each symbol of the kind of tongue indicator 4 and the symbol indicator 5 is formed with a single segment.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is activated. When information of "0" is stored in a certain bit of the RAM 30, a particular dot (segment) of the indicator 2 corresponding to the bit is made dark.

In FIG. 3(b), $S_1$, $S_2$ and $S_3$ are referred to segment electrode signals used for illuminating symbols. $S_4$ to $S_N$ are referred to segment electrode signals used for indicating characters. $H_1$ to $H_7$ represent common electrode signals. $M_1$ to $M_7$ represents a symbol "▲" of the kind of tongue indicator 4, the symbol indicating the mother tongue or the original tongue. $F_1$ to $F_7$ represent another symbol "▼" of the same indicator 4, this symbol indicating the foreign tongue or the translated tongue.

Further in FIG. 3(b), numerals 1 to 7 as the suffix are referred to English, German, Japanese, French, Spanish, another language "○", and further language "Δ", respectively. MT indicates a multivocal word. KA indicates a Japanese "Katakana" letter. SN represents a sentence while WD represents a word. A star "*" indicates that each of words represented in the mother tongue or the original tongue is translated to each of corresponding words represented in the foreign tongue or the translated tongue while grammatical correction or modification meeting with the foreign tongue is not carried out.

The driver 6 provides displaying signals to the indicator 2 when data to be displayed are developed from the microcomputer 8 to apply them to the RAM 30. Since the driver 6 is conventional, further description is omitted.

Figure 4:
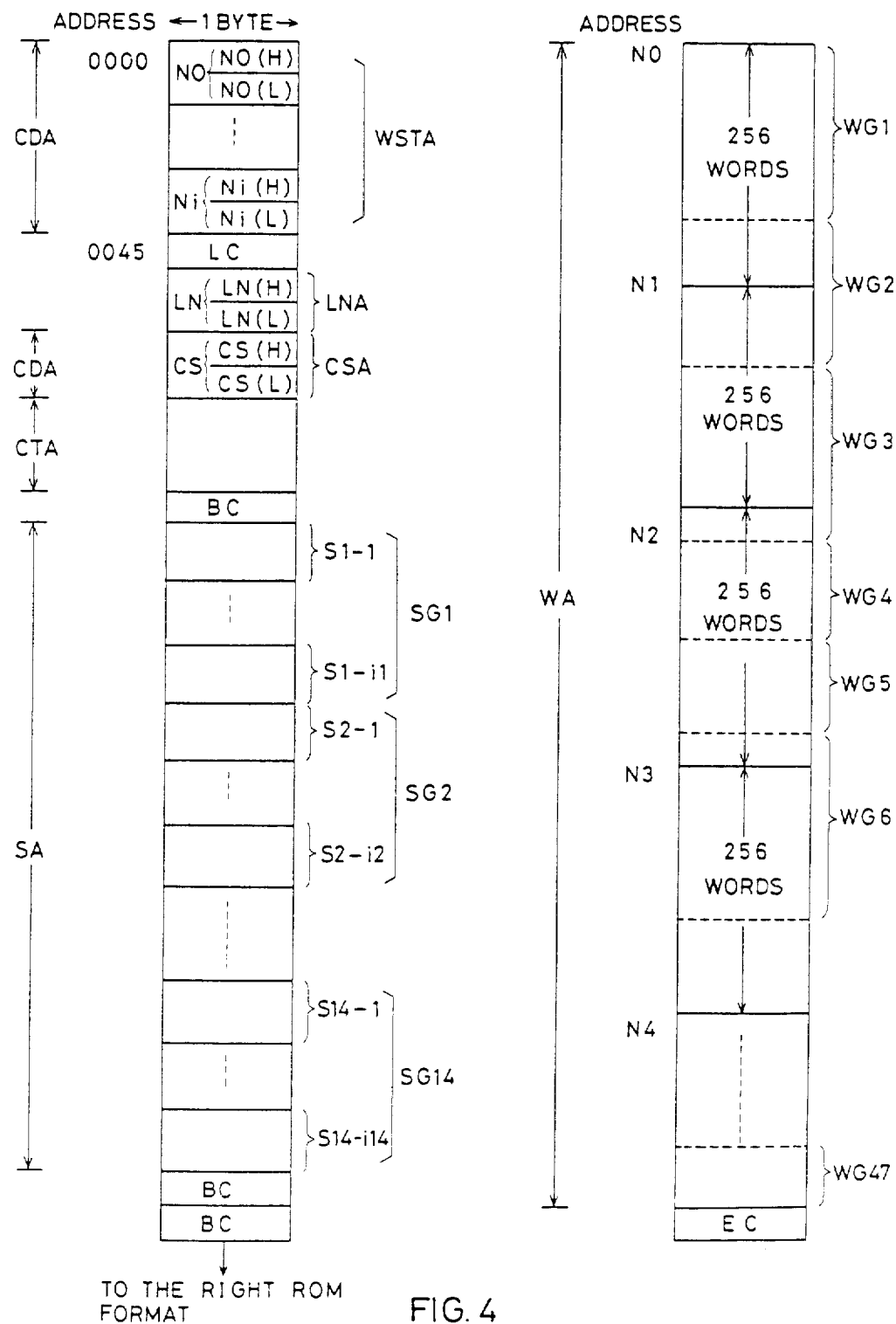
FIG. 4 shows a format of a ROM for memorizing words, the ROM being connected in the circuit of FIG. 2.

FIG. 4 shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of letters "AN" is stored as a compressed code of 1 byte, $CC_1$. Another pair of letters "BA" is stored as a compressed code of 1 byte, $CC_2$. Frequency in occurrence of spelling of English words is determined to select some English spellings having high frequency in occurrence. The thus selected English spelling is changed to corresponding compression codes for memorizing purposes. The data-compression table CTA stores data for presenting correspondence between the selected spellings and the compression codes.

When correspondence between an input word and one or more words memorized in one of the ROMs is to be detected, the input word is changed to codes inclusive of compression codes according to the contents of the data-compression table CTA since each of the ROMs stores codes which may include one of the compression codes. The table CTA is used to show words stored in one of the ROMs by changing the codes to the original spelling. The nature of this table may differ depending on the kind of language to make the degree of data compression the greatest.

Stored words are classified as for example 47 categories in each of which a number of words are ordered. In FIG. 4, a word category n is referred to WGn. Sentences are formed by a combination of a plurality of stored words. These sentences are classified as 14 categories in each of which a number of sentences are ordered. In FIG. 4, a sentence category m is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "c" | airplane |
| 2 | "ri" or "I" | customs |
| 3 | "ru" or "A" | transporting machine |
| 4 | "re" or "J" | at hotel |
| 5 | "ro" or "S" | in restaurant |

TABLE 1-1-continued

| The serial number of the category | corresponding key | the name of the category |
|---|---|---|
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words contains 256 words. A first word address table region WSTA contains a first address referred to $N_0$, $N_1$, $N_2$, ... $N_4$ in FIG. 4. This first address is related to a location in which first codes or first compressed code for representing the first word is stored. In accordance with a specific example of the present invention, each address is represented with two bytes. Each first address is separated into an upper byte referred to $N_0(H)$ to $N_i(H)$ and a lower byte referred to $N_0(L)$ to $N_i(L)$. The first word address table region is used to shorten retrieval time for a specific word.

CS is referred to a first sentence address CS(H) and CS(L) which is stored in a first sentence address region CSA. LNA indicates a memory location for storing a serial number of a word indicating the kind of tongue as referred to LN of LN(H) and LN(L). More particularly, as the ROM storing English words is concerned, a word "English" is necessarily contained in that ROM. In such a case, the number of the word "English" in the ROM is LN starting from the first word of the word group.

Memorizing the serial number LN is suitable for showing in display 3 the kind of the mother tongue and the foreign tongue being selected and it is unnecessary to store an additional word showing the kind of tongue.

The translator of the present invention may comprise audible sound generating means for developing words represented in the mother tongue and/or the foreign tongue. Since such an audible sound genrating means is disclosed in, for example, Hyatt U.S. Pat. No. 4,060,848 issued Nov. 29, 1979, further description is omitted.

In FIG. 4, LC indicates a tongue code in which upper 4 bits indicate a field or subject of language stored in the ROM and lower 4 bits the kind of language stored in the ROM. In particular, there may be present a ROM for storing words oriented to economy, engineering or medicine, respectively. Information representing such a field is stored in LC. The lower 4 bits corresponds to each kind of tongue as follows:

TABLE 1-2

| The lower 4 bits | the kind of language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "o" |
| 0 1 1 1 (7) | a further tongue " " |

In FIG. 4, BC "11111111" is a boundary code and EC "11111111" is an end code of the ROM.

Figure 5:
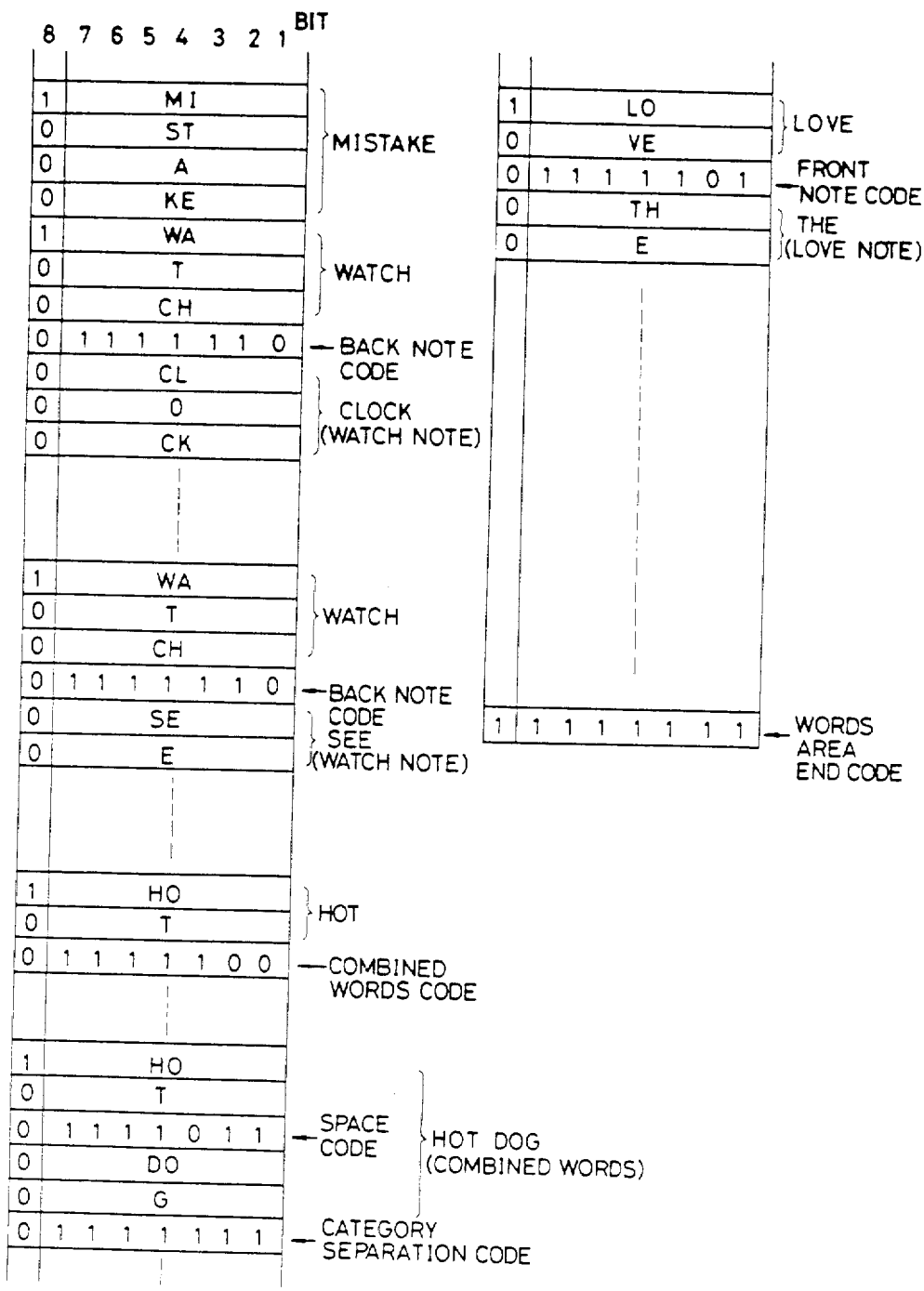
FIG. 5 shows a detailed format of a word data region in the format of FIG. 4.

FIG. 5 shows a detailed format in a word data region WA in the format of FIG. 4 where the ROM stores English words.

In the word data region WA, word data are ordered at in units of 1 byte. The eighth bit of the first word in each word category is defined as "1" while the eighth bit of the second and subsequent words is defined as "0". The first bit through the seventh bit are used to contain letter codes representing letters or compression codes representing letters in compressed manners. For example, a word "WATCH" is memorized such that a pair "WA" are presented by a single compression code of 1 byte, a pair "CH" are presented by another type of single compression code of 1 byte and a letter "T" is represented a letter code of 1 byte. Therefore, five letters of "WATCH" are stored with three bytes.

Each word having a specific meaning corresponds to a translated word. A word identical with another at least in spelling and a homonym, which is a word like another in spelling and pronunciation, is stored with a note for for differentiating between the words. FIG. 5 represents a word "WATCH" having two meanings of "CLOCK" and "SEE" so that a note is added to each as "WATCH (CLOCK)" and "WATCH (SEE)" with a bracket. These notes follow each note code $C_3$ (7E in a hexadecimal notation) in the word data region. The bracket for the note follows the noted word, normally. But, it may precede the noted word in which case the note follows the note code $C_2$ (7D in the nexadecimal notation). In FIG. 5, a note "THE" for a word "LOVE" is provided to be "(THE)LOVE".

A compound word may be formed by at least two words corresponding to a translated word. FIG. 5 shows an example of a compound "HOT DOG". Between the at least two words "HOT" and "DOG", a space code Co (7B in the hexadecimal notation) is inserted. If at least one of the two words is memorized in one of the ROMs and is the first word of the compound, the last letter code of the word (the compression code) is followed by a compound code $C_1$ (7C in the hexadecimal notation). The word "HOT" in FIG. 5 is this type of word to thereby be followed by the compound code $C_1$. The compound code $C_1$ indicates that there are present one or more compounds starting with the word "HOT".

As described above, the stored words are classified as 47 categories. A category separation code $C_4$ (7F in the hexadecimal notation) is provided for showing separation of catagories. This code follows all the words in the same category. In FIG. 5, this code follows the compound "HOT DOG". At the end of the word data region WA, an end code $C_5$ (FF in the hexadecimal notation) is provided.

Figure 6:
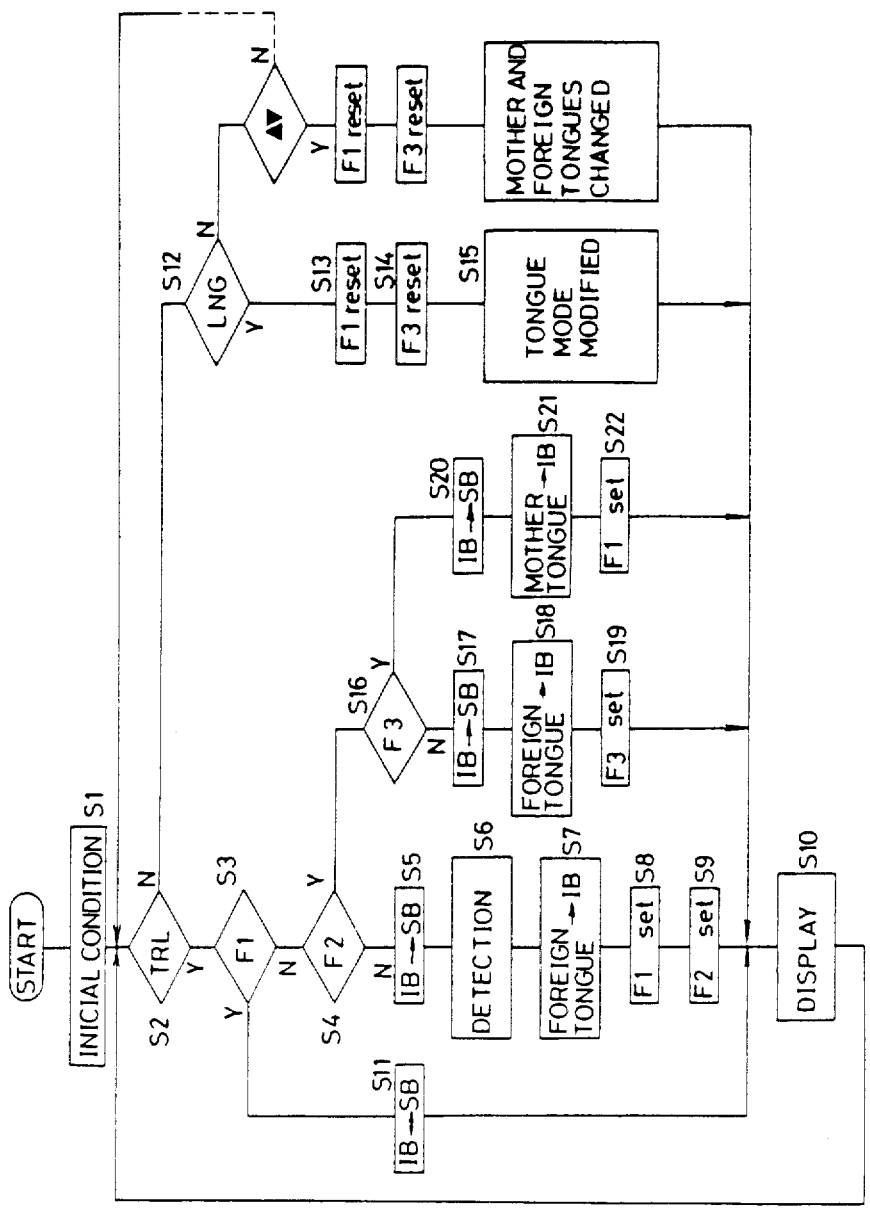
FIG. 6 shows a flow chart of the translator operation according to the present invention.

FIG. 6 shows a flow chart for representing operation of the translator according to the present invention. In the flow chart of FIG. 6, IB indicates an input buffer for storing information to be displayed in the display and SB represents a sidetrack buffer for causing sidetrack operation in connection with the data to be displayed. NO is the serial number of any selected work within the memory. Flag $F_1$ represents that a word of the mother tongue is stored in the input buffer IB and a translated word of the foreign tongue is stored in the sidetrack buffer SB or vice versa. Flag $F_2$ indicates the serial number NO of a selected word within the memory has been already detected. Flag $F_3$ is provided for detecting what number the "TRL" key 43 is actuated after actuation of the "LNG" key 49 or the "▲▼" key 48. All these flags are included within the RAM as shown in FIG. 3(a).

In the following examples English is the mother tongue and Japanese is the foreign and a word "COFFEE" is entered for translation, and the same word is subjected to translation on the condition that Japanese is the mother tongue and German is the foreign tongue.

Firstly, at $S_1$ at least flags $F_1$ and $F_2$ are reset. The first actuation of the translation key 43 referred to "TRL" causes $S_2 \rightarrow S_3 \rightarrow S_4 \rightarrow S_5$. $S_5$ is executed to transport the contents of the input buffer IB to the sidetrack buffer SB. $S_6$ is operated to detect the serial number of the contents, the word "COFFEE", of the input buffer IB within the memory. An equivalent word corresponding to this word "COFFEE" is entered to the input buffer IB. $S_8$ and $S_9$ are executed to set flags $F_1$ and $F_2$. $S_{10}$ is operated to display the contents of the input buffer IB within the indicator 3.

Secondly, the translation key 43 is depressed to select $S_2 \rightarrow S_3 \rightarrow S_{11}$ in order to exchange the contents of the input buffer IB and those of the sidetrack buffer SB with each other. The display information is "COFFEE".

Thirdly, the language key 49 referred to "LNG" is actuated to select $S_{12} \rightarrow S_{13} \rightarrow S_{14}$ in order to reset the flags $F_1$ and $F_3$. $F_{15}$ is executed to change the translation mode from a mode where English and Japanese words are translated to each other, to another mode where German and Japanese words are translated to each other.

More particularly, actuation of the language key 49 enables that the former foreign language (Japanese) is changed to the present mother language (German) and the former non-selected language is changed to the present foreign language. Translation from the present mother language to the present foreign language beings in response to actuation of the translation key 43 just after the time when the language key 49 has been operated.

Fourthly, the translation key 43 is operated to select $S_2 \rightarrow S_3 \rightarrow S_4 \rightarrow S_{16} \rightarrow S_{17}$. $S_{17}$ is executed to transfer the contents of the input buffer IB to the sidetrack buffer SB. $S_{18}$ is selected to apply a corresponding German word "KAFFEE" to the input buffer. Since the serial number NO of the English word "COFFEE" has been detected in $S_6$, it is sufficient in $S_{18}$ to enter the German word "KAFFEE" having the same serial number specified as NO from the German ROM to the input buffer IB. $S_{19}$ is used to set the flag $F_3$.

Lastly, the translation key is operated to select $S_2 \rightarrow S_3 \rightarrow S_4 \rightarrow S_{16} \rightarrow S_{20}$ in order to transfer the contents of the input buffer IB to the sidetrack buffer SB. $S_{21}$ is selected to enter the Japanese word of the mother tongue to the input buffer by introducing to the input buffer the the Japanese word having the same serial number specified as NO of the word "COFFEE" detected in $S_6$. $S_{22}$ is used to set the flag $F_1$.

FIG. 7 shows a table for representing the above described language changing operation.

Following the last line of the table of FIG. 7, the translation key can be operated to cause $S_{11}$ so as to exchange the contents of the input buffer for those of the sidetrack buffer. A reversible key 48 marked as "▼▲" can be operated in a similar manner to the language key. In addition to the above case where a single word is subjected to translation, a sentence and some words in a sentence can be translated.

As described above, retrieval of any word or sentence selected from the memory is carried out by operating the translation key 43 at the time when the word or sentence is firstly input. The serial number of the selected word or sentence is detected and memorized as the information of NO. The memorized serial number is used to cause retrieval of its corresponding word or sentence. It is unnecessary to detect equivalency per se between the first word or sentence and its corresponding word or sentence.

The memorized serial number can be used for the multilingual translation to thereby shorten retrieval time period of the translated word or sentence.

Each time the translation key is actuated, the relation of the mother tongue and the foreign tongue is reversed.

FIGS. 8(a) through 8(d) show detailed formats of the sentence data region SA in the format of FIG. 4(a) related to English or Japanese.

A plurality of words form a sentence where each of the words is memorized with the compression code.

The eighth bit of a first entry for a word is represented as "1". Letter codes or compression codes representing a particular word are contained before next occurrence of the eighth bit of "1". For separation of the sentences, two types of codes $C_7$ and $C_8$ are used in which $C_7$ is added following an affirmative sentence and $C_8$ is added following an interrogative sentence. The code $C_7$ is "FE" in the hexadecimal notation and $C_8$ is "FC" in the same.

As described above, the memorized sentences are classified as 14 categories. A category separation code $C_9$ is used for indicating separation between the categories. The code $C_9$ is represented as "FF" in the hexadecimal notation. This code $C_9$ follows the code $C_7$ or $C_8$. FIG. 8(a) shows a sentence "GOOD LUCK." which is memorized at the end of a particular sentence category.

It may be possible that the same sentence is included in two or more categories. In such a case, to reduce the number of bytes for the memory, the sentence is memorized as such in one category while the leading address of the stored sentence in this category is memorized in another type of category. An address memory code $C_{10}$ (FD in the hexadecimal notation) is used for this control purpose. Two bytes following the code $C_{10}$ are used to memorize an address "SSA" for the code (compression code) of the leading letter of the first word contained in the sentence which is in common.

As a feature of the translator according to the present invention, one or more words in an exemplary sentence in an original language can be altered to form another sentence in the original language. The thus modified sentence is translated. Such words which can be altered are provided with brackets in a displayed form. At most, two words can be altered in a single sentence as shown in FIG. 8(a).

Figures 8B, 8C:
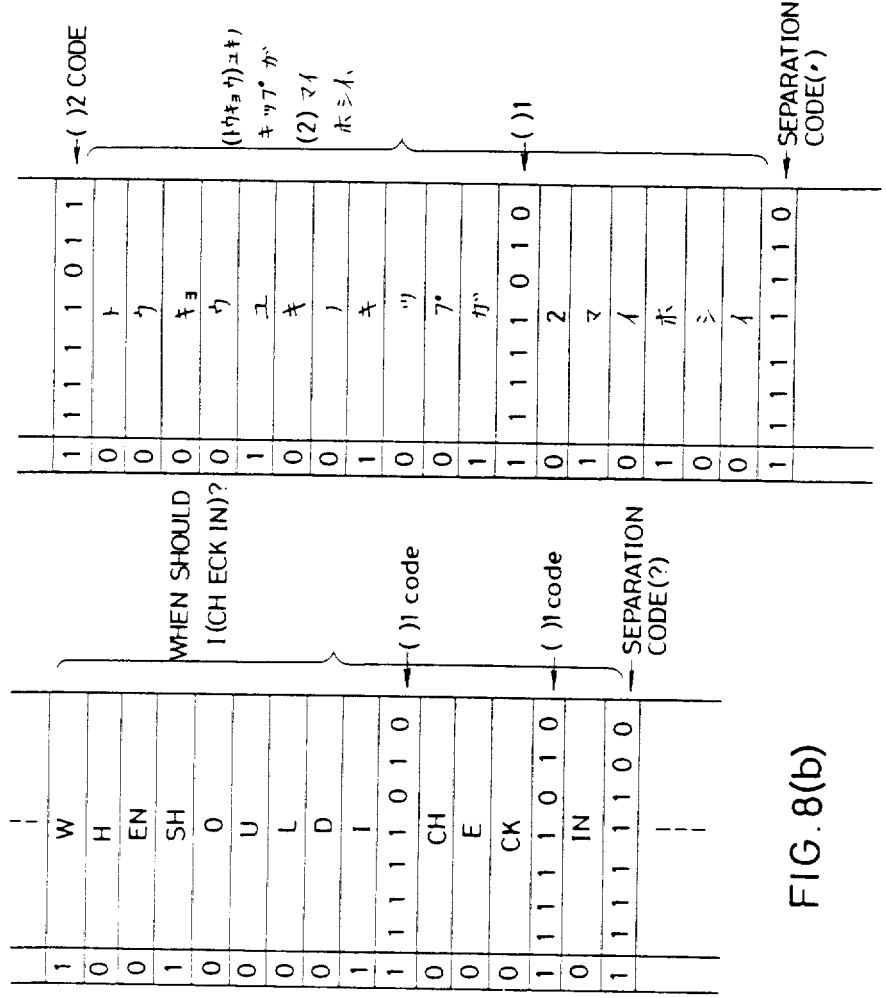

FIG. 8(a) shows an exemplary sentence of "A LITTLE MORE (MILK) PLEASE.". A word provided within brackets is specified by a bracket 1 code $C_{11}$ (FA in the hexadecimal notation). With the eight code of "0" following this code $C_{11}$, the lower seven codes are the letter codes (the compression code). When two words are to be inserted within the brackets as being a phrase or an idiom, the code $C_{11}$ is inserted between the words. For example, a phrase of "CHECK IN" is inserted between the words to thereby form a code line of "Code $C_{11}$, CHECK, Code $C_{11}$, IN" as indicated in FIG. 8(b).

FIG. 8(c) shows another example, say "I WANT (2) TICKETS TO (TOKYO)." when represented in English. (2) is represented by use of the code $C_{11}$ while (TOKYO) is represented by use of another bracket code $C_{12}$ (FB in the hexadecimal noration). No limitation is present that the code $C_{11}$ necessarily precedes the code $C_{12}$. FIG. 8(c) shows an example represented in Japanese. As indicated in FIG. 8(c), the code $C_{12}$ precedes the code $C_{11}$ since the order of words is different between English and Japanese.

In this type of translator, the first brackets in an English sentence are represented with the code $C_{11}$ and the second brackets in the English sentence are represented with the code $C_{12}$. In the translated sentence, the brackets corresponding to the first brackets in the English sentence are also represented with the code $C_{11}$ and the brackets corresponding to the second brackets in the English sentence are also represented with the code $C_{12}$. When only one bracket pair is used in a sentence, the code $C_{11}$ is necessarily used.

FIG. 9 shows a table containing the letter codes, the compression codes, and the control codes each of which is used in the format of FIG. 5.

In the word data region, data for each word occupies 1 byte. It is possible to provide 256 variations of data by the eight bits. But, the eighth bit is used to indicate the beginning of each word. The remaining seven bits can be selectively combined to provide 128 combinations of data.

The codes in the shaded parts in the table of FIG. 9 are the figure codes, the symbol codes, and the control codes all of which are used in common with the respective tongues. In the remaining parts, the letter codes (alphabets in FIG. 9) and the compression codes are provided. The control codes $C_0$ to $C_5$ function as those described in FIG. 5.

The respective codes represent as follows:

$C_0$: a space
$C_1$: a compound
$C_2$: a forward note
$C_3$: a back note
$C_4$: a category separation
$C_5$: the end of a word data area
$C_6$: a dummy which is not stored as particular data in connection with a word or sentence.

FIG. 10 shows a detailed format of the compression table, related to the English words, in the format of FIG. 4. The format of FIG. 10 corresponds to the compression table of FIG. 9.

In FIG. 10 the lower seven bits with an eighth bit of "1" represent a letter as the letter codes. The lower seven bits with an eighth bit of "0" are the compression codes for the preceding letter codes. An end code $C_6$ is provided for representing the end of the compression codes. The nature of the compression table varies, depending on the type of tongue so as to achieve the highest efficiency.

Figure 11:
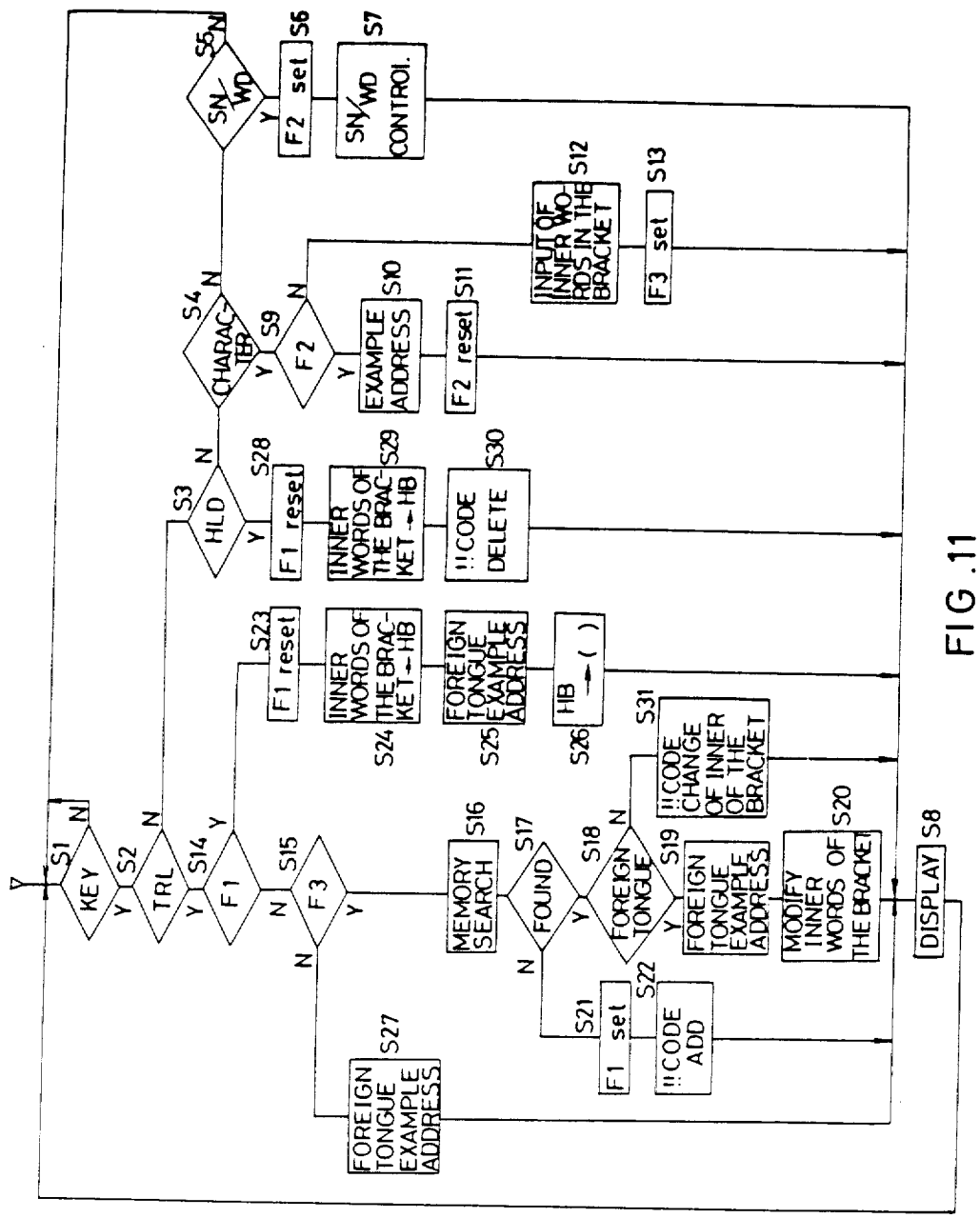
FIG. 11 shows a flow chart of the translator operation according to the present invention.

FIG. 11 shows a flow chart according to which a holding operation for retaining an entered word without translation is performed.

Figure 3:
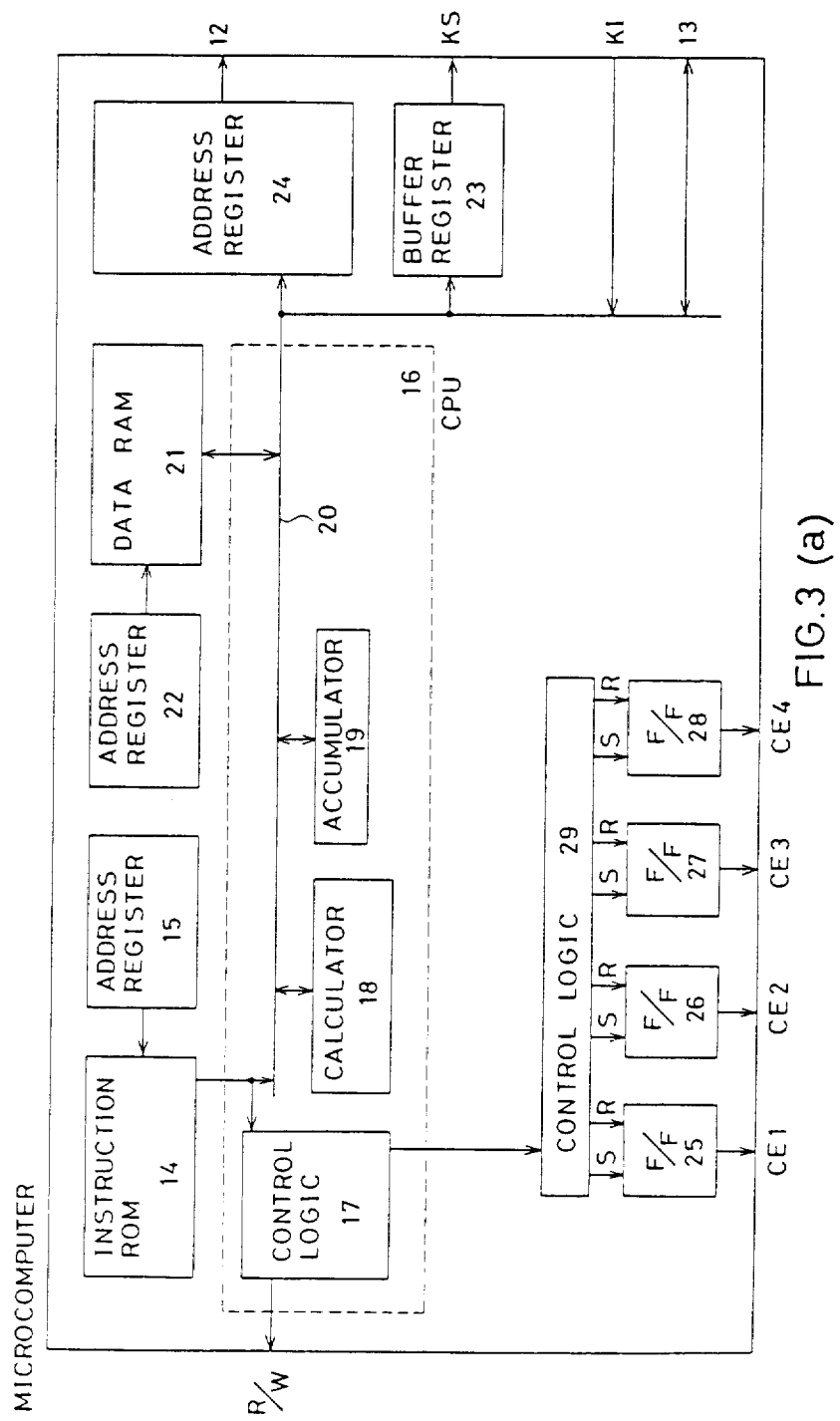
FIG. 3(a) is a block diagram of microcomputer 8 of FIG. 2.
FIG. 3(b) is a block diagram of driver 6 of FIG. 2.
Figure 3:
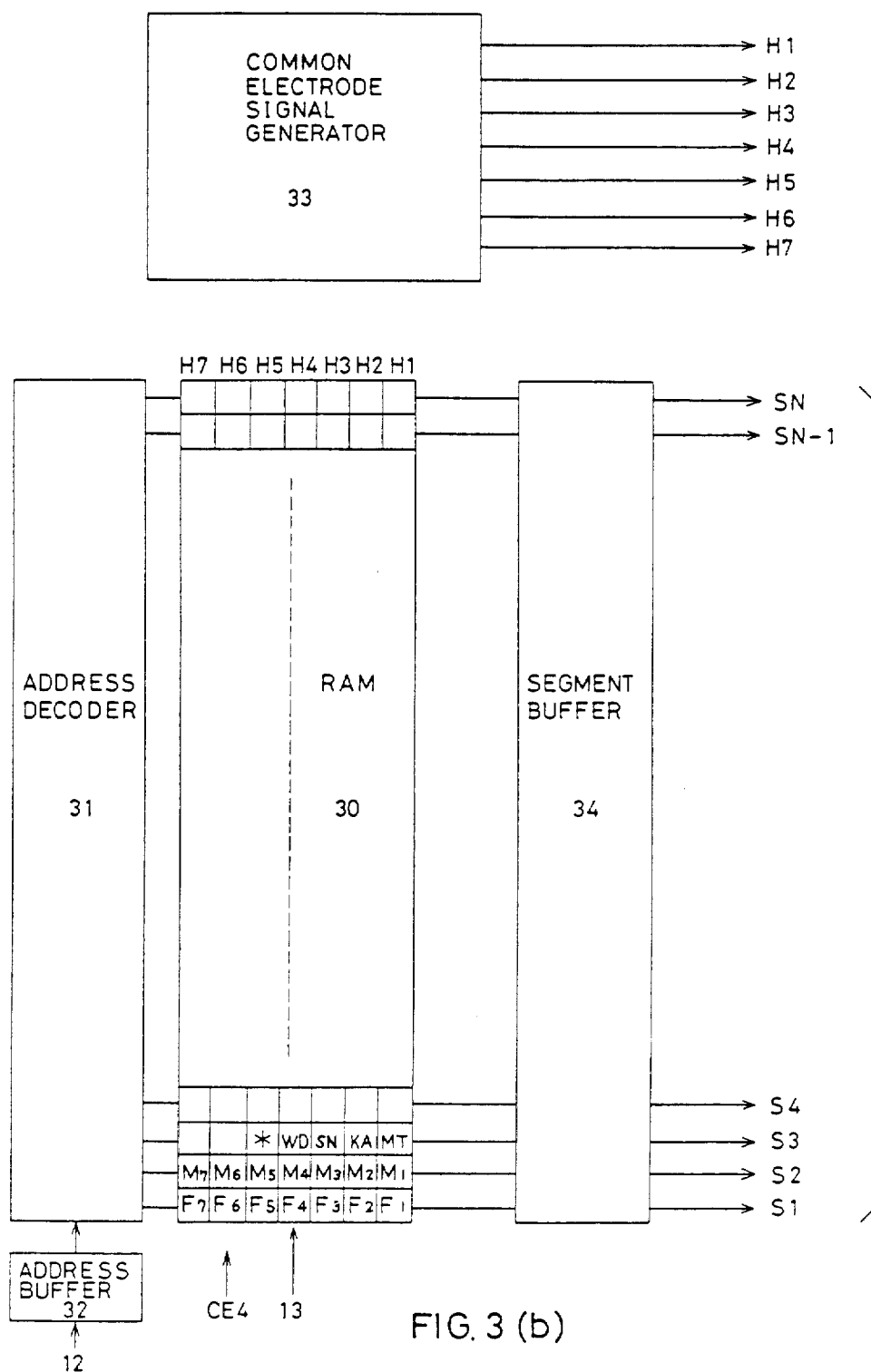

In this flow chart, the respective characters represent the following elements all of which are included within the RAM of FIG. 3.

HB: a buffer for storing a word subjected to the holding operation
$F_1$: a flag indicating that a word equivalent to an entered word is not found when the translation key is actuated to translate the entered word
$F_2$: a flag for indicating the mode in which exemplary sentences should be addressed
$F_3$: a flag for representing that a word or phrase provided within the brackets of an exemplary sentence is replaced by a new word or phrase.

With reference to FIG. 11, the holding operation is now described.

The "SN/WD" key 41 is actuated to select $S_1 \rightarrow S_2 \rightarrow S_3 \rightarrow S_4 \rightarrow S_5$. $S_6$ is selected to set the flag $F_2$. $S_7$ is selected to select a category by changing from a word selection mode to a sentence selection mode with actuation of the "SN/WD" key 41. One of the category keys is actuated to select $S_4 \rightarrow S_9 \rightarrow S_{10} \rightarrow S_{11}$. An exemplary sentence is retrieved from the mother tongue memory. The exemplary sentence is applied to the input buffer. $S_{11}$ is selected to reset the flag $F_2$.

If the sentence applied to the input buffer has any word or phrase within the brackets, the operator can replace the word or phrase with a new one. For this purpose, the keyboard is actuated to enter the new one. Therefore, $S_4 \rightarrow S_9 \rightarrow S_{12}$ is selected and each of the letters of the new word or phrase is introduced into the brackets which are included within the sentence presently stored in the input buffer.

$S_{13}$ is selected to set the flag $F_3$ each time one of the letters of the old word or phrase is replaced by a new one. The translation key 43 is operated to select $S_2 \rightarrow S_{14} \rightarrow S_{15} \rightarrow S_{16}$ in order to retrieve the same word or phrase as the entered new one from the mother tongue memory. If there is any word or phrase having the same spelling as that of the entered one in this memory, $S_{18}$ is selected to detect whether a corresponding word or phrase equivalent to the word or phrase is found in the foreign tongue memory.

If the corresponding word or phrase is present in the foreign tongue memory, $S_{19}$ is operated to retrieve a translated exemplary sentence from the foreign tongue memory by reading out from the memory the translated exemplary sentence having the same serial number as that of the mother tongue sentence addressed in $S_{10}$, entering it to the input buffer. The word or phrase in the brackets is translated to one of the foreign tongue by extracting from the memory the translated word or phrase having the same serial number as that detected in $S_{16}$.

A specific example of the holding operation is now described where English is the mother tongue and Japanese is the foreign tongue in connection with an exemplary sentence "WHERE IS THE (PAN AM) COUNTER?".

(A)

If the new word or phrase to be contained within the brackets is present in the foreign tongue memory:

| Key Operation | Letter Display |
|---|---|
| JAL | "WHERE IS THE(PAN AM) COUNTER?" |
| "TRL" | "WHERE IS THE(JAL) COUNTER?" |
| | *(=ホンコウクウ)ノ カウンター ハ ドコデスカ* |

(B)

If the new word or phrase to be contained within the brackets is not present in the foreign tongue memory:

| Key Operation | Letter Display |
|---|---|
| | "WHERE IS THE (PAN AM) COUNTER?" |
| JAL | "WHERE IS THE (JAL) COUNTER?" |
| "TRL" | "WHERE IS THE (JAL!!) COUNTER?" |
| "TRL" | *(JAL)ノ カウンター ハ ドコデスカ.* |

The word "JAL" within the brackets is not present in the foreign tongue memory so that $S_{17} \rightarrow S_{21} \rightarrow S_{22} \rightarrow$ is selected. The flag $F_1$ is set and the double exclamation mark "!!" is added at the end of the newly entered word. The translation key 43 is activated to select $S_2 \rightarrow S_{14} \rightarrow S_{23}$ so as to reset the flag $F_1$. $S_{24}$ is selected so that the inner word "JAL" provided within the brackets is applied to the holding buffer HB. $S_{25}$ is operated to extract a foreign tongue sentence having the same serial number as that of the mother tongue sentence from the mother tongue memory. $S_{26}$ is executed to delete the word "PAN AM" (Pan American World Airways) from the inside of the brackets while the newly entered word "JAL" (Japan Air Line) in the holding buffer HB is introduced into the input buffer. Therefore, a modified sentence with the word "JAL" is obtained.

If no modification of the word within the brackets takes place, the translation key is operated to select $S_{15}$, $S_{27}$ to display an equivalent foreign tongue sentence.

(C)

If the operator knows that the new word or phrase to be contained within the brackets is not present in the foreign tongue memory before he operates the translator:

| Key Operation | Letter Display |
|---|---|
|  | "WHERE IS THE (PAN AM) COUNTER?" |
| JAL "HLD" | "WHERE IS THE (JAL) COUNTER?" |
| "TRL" | "(JAL) ノ カウンター ヘ ドコデスカ. * " |

In this case, after the word within the brackets is replaced by a new word presently entered, the holding key 47 specified as "HLD" is activated to leave the new word without translation. $S_{23}$ is operated to reset the flag $F_1$. $S_{29}$ is executed to enter the new word into the holding buffer HB. The code indicating the double exclamation mark "!!" is deleted, such code being delivered only in response to actuation of the translation key 43 prior to that of the "HLD" key 47.

(D)

If the new word or phrase to be contained within the brackets is not found in the foreign tongue (Japanese) memory but found in the mother tongue (English):

| Key Operation | Letter Display |
|---|---|
|  | "WHERE IS THE (PAN AM) COUNTER?" |
| JAL | "WHERE IS THE (JAL) COUNTER?" |
| "TRL" | "WHERE IS THE (!!) COUNTER?" |
| JAL "HLD" | "WHERE IS THE (JAL) COUNTER?" |
| "TRL" | "(JAL) ノ カウンター ヘ ドコデスカ. * " |

In this case, $S_{18} \rightarrow S_{31}$ is selected. $S_{31}$ is operated to delete the word within the brackets and to insert a code representing "!!" therein in order to provide a display of "WHERE IS THE (!!) COUNTER?". This indicates that the new word or phrase is not contained in the foreign tongue memory. "JAL" is entered by key operation and the "HLD" key is operated to provide a Japanese translated sentence as shown in the last line of this table.

The detection of whether the new word is stored in the mother tongue memory but is not stored in the foreign tongue memory is made as follows:

(i) It is determined whether a foreign tongue word corresponding to the serial number of the new inner word in the mother tongue is represented by the dummy code or not: The dummy code occupies 1 byte to form a dummy word as shown in FIG. 5. $C_6$ indicates the dummy code as viewed in FIG. 9. The dummy code is used to represent insignificant words or sentences which can be omitted from the data in the memory.

(ii) It is determined whether the serial number of the new word in the mother tongue exceeds the number of words which can be stored in the foreign tongue memory: When there are stored more words in the mother tongue memory than words stored in the foreign tongue memory, the excess words are not stored in the foreign tongue memory.

The above features of the present invention can be summarized as follows:

(1) The bidirectional translation between the mother tongue and the foreign tongue is enabled in response to operation of the single translation enabling key.

(2) When the display indicates that no corresponding translated word equivalent to an input word is present in response to actuation of the translation enabling key, the holding key is actuated to hold or leave the input word without translation as referred to the holding operation.

(3) The dummy code is provided for representing insignificant words or sentences which can be omitted from the data in the memory.

OPERATION OF THE TRANSLATOR (1) Display:

With reference to FIG. 1, the letter indicator 3 displays letters, Japanese "Katakana" letters, figures and symbols. The kind of tongue indicator 4 displays the marks " ↑ " and " ▼ ". The symbol indicator 5 contains the symbols TM, KA, SN and WD specified with the symbol " ▼ ", and the star "*". Indication of these symbols is enabled with control of the driver 6 by developing corresponding data from the microcomputer 8.

(2) Translation Principle:

The system of FIG. 2 has the capability of translating among three languages. A specific type of ROM memorizes a great number of words and sentences as shown in FIG. 4(a). Each of the words and sentences corresponds to translated words and translated sentences. This correspondence is established by the common serial numbers of words and sentences. More particularly, a specific sentence "GOOD MORNING." is assumed to be memorized as the 100th sentence in a ROM related to English.

A corresponding Japanese sentence is stored in the 100th sentence in another ROM related to Japanese. A further corresponding German and translated sentence "GUTEN MORGEN." is stored in the 100th sentence in a further ROM related to German.

Similarity is likewise established in connection with words a specific word having a serial number in a ROM corresponds to a translated word of the same serial number in another ROM.

Conducting the translation by the translator is done by finding the serial number of a word or a sentence in the mother tongue ROM and locating a translated word or sentence having the serial number in the foreign tongue ROM.

The translation operation comprises the following steps:

(i) the first step: selecting the ROM of the mother tongue (ii) the second step: detecting the serial number of a word or a sentence in the thus selected ROM (iii) the third step: selecting the ROM of the foreign tongue, and (iv) the fouth step: detecting a translated word or a translated sentence having the same serial number in the foreign tongue ROM.

(3) Translation of a Specific Sentence Addressed with Selection of a Catagory:

With reference to FIG. 1, keys specified with each of $L_1$ through $L_{14}$ are category selection keys. If necessary, a picture suggesting the kind of category may be provided adjacent each of category selection keys. Selection by each of these keys is enabled following actuation of SN/WD key 41 where the indicator 5 indicates the mark "▼".

A SRC key 42 is actuated for seaching sequentially a plurality of sentences belonging to the same category. After the last sentence in the category is outputted, the first sentence in this category is to be addressed. When a sentence is addressed, the serial number of this sentence is outputted. A TRL key 43 is actuated for enabling the third step and the fourth step as described in item 2 to provide translation of this sentence.

Translation of a specific sentence addressed with selection of a category is enabled according to the following steps:

(i) the first step: selecting a ROM of the mother tongue
(ii) the second step: illuminating the mark "▼" by actuating the key 41
(iii) the third step: actuating one of the category keys $L_1$ through $L_{14}$
(iv) the fourth step: actuating the SRC key 42 so that the serial number of the specific sentence is detected and the translation key 43 is actuated
(v) the fifth step: selecting the ROM of the foreign tongue
(vi) the sixth step: detecting a translated sentence having the same serial number in the foreign tongue ROM (4) Translation of an Inputted Word:

Spelling of a word is entered by actuating letter keys 44 and the translation key 43 is actuated to provide translation from the mother tongue to the foreign tongue as indicated in the indicator 4. Some cases may be different from one another depending on the word entered as follows.

(i) the spelling entered is not found in the ROM of the mother tongue
(ii) only one type of spelling identical with the spelling entered is present in the ROM of the mother tongue.
(iii) a plurality of kinds of spelling identical with the spelling entered are present in the ROM of the mother tongue In connection with item (i), no word is memorized which is identical with the entered word. A double exclamation mark "!?" follows the end of the entered word which is displayed after actuation of the translation key 43.

In connection with item (ii), the serial number of the identical spelling in the ROM of the mother tongue is detected and selection of ROM having the foreign tongue is enabled, and a translated word having the same serial number in the selected ROM of the foreign tongue is detected and displayed.

More particularly, it is supposed that English is selected as the mother tongue and Japanese is selected as the foreign tongue. A word "SEE" is entered and the translation key 43 is actuated. Under the circumstances, the first word in the English ROM is addressed so that equivalency between spelling of the entered word and the first word is determined. When there is no equivalency, a counter for storing the serial number of the word is advanced by one to address the second word. If the word of "SEE" is detected in the English ROM by advancing the address of the counter up to the serial number, say, 500 of this word, equivalency is detected. The Japanese ROM is then selected so that a translated word is developed by specifying the serial number 500 of the Japanese ROM. Translation is thus enabled.

In connection with item (iii), these homonyms are noted in the memorized format as indicated in FIG. 5. A specific meaning is determined by the operator of the translator. A specific display with a note and a mark "!?" following the entered word is enabled to indicate that the entered word has a plurality of translated words.

In particular, a word "WATCH" of FIG. 5 is assumed to be entered. Firstly, this word is entered and the translation key 43 is actuated to indicate

"WATCH (CLOCK) !?".

Now the search key 42 is actuated to indicate another translated word equivalent to the word "WATCH".

"WATCH (SEE) !?"

While either of these alternative displays is displayed, the translation key 43 is actuated to obtain a corresponding translated word. At the same time, when a word having a homonym is entered, the indicator 5 illuminates the symbol "▼" directed to TM indicating that there are one or more additional translated words equivalent to the entered word.

(5) Translation of Two or More Entered Words:

The instant translator can translate two or more entered words. The space key 45 is actuated to separate these words from one another. When the first word is entered and the space key 45 is actuated, the second word can be entered if the first word entered is contained in the ROM of the mother tongue. If the first word is not stored in the ROM or belongs to the homonym, operation similar to items (i) and (iii) is conducted.

Under the circumstance that all of the words "I", "AM", "A" and "BOY" are assumed to be memorized in the English ROM, entry operation of "I", "SPC", "AM", "SPC", "A", "SPC" and "BOY" is conducted to indicate in the display 3.

"I AM A BOY".

Upon actuation of the translation key 43, translated words are obtained in the dipslay 3 while the order of the translated words is identical to the order of the entered words. That is, regardless of the proper grammatical order in the translated tongue, the translated words respectively corresponding to the entered words are in the same order. The star "*" is indicated in the indicator 5 representing this situation.

(6) Entry of Words with the Brackets and Translation Thereof:

With reference to FIG. 8(a), an exemplary sentence "A LITTLE MORE (MILK) PLEASE." is addressed to indicate "A LITTLE MORE ((MILK)) PLEASE." Upon actuation of the translation key 43, a translated sentence which is stored in the format of FIG. 8(d) in the Japanese version, is indicated in which a translated word corresponding to "((MILK))" is indicated with a single bracket.

While the exemplary English sentence is displayed, a word "COFFEE" is entered by the alphabetical keys to indicate "A LITTLE MORE ((COFFEE)) PLEASE."

Upon actuation of the translation key 43, a corresponding translated sentence is formed and displayed only if the word "COFFEE" is memorized in the English ROM. When not, operation similar to item (i) or (iii) of item (4) should be conducted.

Modification and translation of the word provided with the brackets are effected as follows:

A sentence with the brackets is addressed by following the first to the fourth steps of item (3):

(v) the fifth step: the word contained within the brackets in the addressed sentence is replaced by the word entered before the translation key 43 is actuated (iv) the sixth step: in the ROM in the mother tonque, a word having the spelling of the entered word is detected and the serial number thereof is detected In case where such a word can not be detected in the ROM or there are two or more words having the spelling of the entered word, operation is similar to item (i) or (iii) of item (4). The following steps should be effected corresponding to item (ii) of item (4).

(vii) the seventh step: selecting the ROM of the foreign tongue (viii) the eighth step: extracting a sentence having the same serial number as the serial number from the ROM of the foreign tongue so that the sentence is applied to the buffer register. The $C_{11}$ code or the $C_{12}$ code is also applied to the buffer register.

(iv) the ninth step: extracting the word having the same serial number as that of the word which is detected in the sixth step and inserting the extracted word between the brackets represented by the bracket code applied to the buffer register in the eighth step With respect to the sentence having the two kinds of brackets, the bracket key 46 is actuated for inserting a desired word between the brackets. The following sentence is exemplary.

"I WANT ((2)) TICKETS TO (TOKYO)"

The former brackets are displayed as double brackets while the latter ones are displayed as a single bracket. An entered word or phrase is led to be inserted between the double brackets. Upon actuation of the bracket key 46, the single bracket is replaced by the double brackets while the double brackets are replaced by the single bracket. Thus, the other word now contained in the double brackets can be replaced by new entered one. Position of the double brackets is changed each time the bracket key 46 is actuated. Translation of the entered word or phase is conducted by the manner as described above.

(7) Retaining the Word without Translation:

A holding key 47 referred to HLD is actuated for identifying, for example, a person's name or a proper noun which should not be translated. Actuation of the holding key 47 follows entry of this kind of word. Then, even when the translation key 43 is actuated, this kind of word is not translated. If the translation key 43 is actuated following entry of this kind of word, the double exclamation mark is added to the end of the entered word, which is indicated, as described in item (4). In such a case, the translation key 43 is further actuated, the above holding operation is effective in the same manner as in the case of actuation of the holding key 47.

(8) Automatically Retaining the Entered Word without Translation:

FIGS. "0" through "9" and symbols "$", "." (period) ":" (colon), "?" (question mark) are not subjected to translation under the condition they are not added to any other words. It is not necessary to actuate the holding key 47.

(9) Addressing Words Classified in the Categories:

As shown in FIG. 4(a), the words are classified as 47 categories so that each of the words can be addressed in the similar manner as in the case of addressing each of the sentences according to the kind of category.

(10) Searching Words Entered by the Keyboard:

Each word entered by the keyboard can be random accessed according to its spelling.

KEY OPERATION IN THE TRANSLATION

A. Translation of a single word entered is conducted by key operation as referred to tables 2 through 6 in which case English is the mother tonque and German is the foreign tongue so that the indicator 4 displays as follows:

TABLE 2

| Key Operation (ENG → GER) | | Letter Display |
|---|---|---|
| "TREE" | "TRL" | BAUM |
| | "TRL" | TREE |
| | "TRL" | BAUM |

TABLE 3

| Key Operation | | Letter Display |
|---|---|---|
| "TREES" | "TRL" | TREES!! |
| | "SRC" | TREE!? |
| | "TRL" | BAUM |
| | "TRL" | TREE |

TABLE 4

| Key Operation | | Letter Display |
|---|---|---|
| "TRE" | "TRL" | TRE!! |
| | "E" | TREE |
| | "TRL" | BAUM |
| | "TRL" | TREE |

TABLE 5

| Key Operation | | Letter Display | Symbol Display |
|---|---|---|---|
| "LOVE" | "TRL" | (THE) LOVE!? | |
| | "SRC" | (TO) LOVE!? | |
| | "TRL" | LIEBEN | TM ▼ |
| | "TRL" | (TO) LOVE | TM ▼ |

TABLE 6

| Key Operation | | Letter Display |
|---|---|---|
| "ABC" | "TRL" | ABC!! |
| | "TRL" | ABC |
| | "TRL" | ABC |

Table 2:

After the spelling of a word is entered and the translation key 43 referred to "TRL" is actuated, translation from the mother tongue to the foreign tongue as specified in the indicator 4 is conducted. The translation key 43 is additionally actuated to thereby indicate the entered word of the mother tongue.

Tables 3 and 4:

The double exclamation mark "!!" is added to indicate that no word having the same spelling as the entered word is present in the mother tongue ROM. The search key 42 is actuated to display a word having the spelling which is the nearest to the spelling of the entered word from the mother tongue ROM. Such a word is followed by the mark "!?" when indicated. This is a question, whether this word is intended, by the translator.

Table 5:

In case where the entered word has many translated words as being a homonym, the translation key 43 is actuated so that the entered word added by the note and the mark "!?" is displayed. Upon actuation of the search key 42, the entered word with another type of note added and the mark "!?" is displayed. When an intended word is displayed, the translation key 43 is actuated. Referring to table 5, the word "LOVE" is a noun and a verb so that the word as the noun is indicated by the display of "(THE) LOVE!?" and the word as the verb is indicated by the display of "(TO) LOVE!?".

Table 6:

The word "ABC" is not memorized in the mother tongue ROM. This word is assumed to be a proper noun so that this word is not subjected to translation.

B. Translation of a plurality of words entered is conducted by key operation as referred to tables 7 and 8 in which case English is the mother tongue and Japanese is the foreign tongue so that the indicator 4 displays as follows;

TABLE 7

| ENG ↑ | JPN ↓ | |
|---|---|---|
| Key Operation | | Letter Display |
| "A" | "SPC" | A - |
| "BIG" | "SPC" | A BIG - |
| "TREE" | "TRL" | ヒトツノ オオキイ キ(ジュモク) |
| | "TRL" | A BIG TREE |

TABLE 8

| Key Operation | | Letter Display |
|---|---|---|
| "I" | "SPC" | I - |
| "LOVE" | "TRL" | I(THE) LOVE!? |
| "SRC" | | I(TO) LOVE!? |
| "SPC" | | I(TO) LOVE - |
| "YOU" | "TRL" | ワタシ アイスル アナタ |
| | "TRL" | I(TO) LOVE YOU |

The space key 45 is used to obtain translation of a plurality of words. When this key is actuated, the entered word is displayed as such. But translation is enabled in the inner circuit. The meanings of adding the marks "!!" and "!?" are similar to the case of item A. The star "*" is necessarily indicated when obtaining from several native words several translated words, respectively since the translated words are not rearranged to provide a proper sentence in a grammatical sense.

C. Retaining entered words without translation is effected as referred to tables 9 and 10 in which case English is the mother tongue and German is the foreign tongue.

TABLE 9

| Key Operation | | Letter Display |
|---|---|---|
| "I" | "SPC" | I - |
| "GO" | "SPC" | I GO ON!? |
| | "SPC" | I GO!? |
| | "SPC" | I GO - |
| "TO" | "SPC" | I GO TO - |
| "OSAKA" | "HLD" | I GO TO OSAKA - |
| | "TRL" | ICH GEHEN ZU OSAKA |

TABLE 10

| Key Operation | Letter Display |
|---|---|
| | I GO TO OSAKA - |
| "TRL" | I GO TO OSAKA !! |
| "TRL" | ICH GEHEN ZU OSAKA |

In the example of table 9, the holding key 47 is actuated to hold the words "OSAKA". As shown in Table 10, in place of the holding key 47, when the translation key 43 is actuated, the mark "!!" is indicated to represent that the word "OSAKA" is not stored in the mother tongue ROM. When this key 43 is further actuated, this word "OSAKA" is held, the same display as table 9 is enbaled as can be seen in table 10.

D. Automatic retaining operation of entered words without translation is shown in Table 11 in which the mother tongue and the foreign tongue are like the example of tables 9 and 10.

TABLE 11

| Key Operation | | Letter Display |
|---|---|---|
| "A.M." | "SPC" | A.M. - |
| "7:30" | | A.M. 7:30 - |
| "TRL" | | A.M.(VORMITTAG)7:30 |

E. Addressing operation for addressing exemplary sentences and translation thereof is indicated in table 12. in which English is the mother tongue and Japanese is the foreign tongue.

TABLE 12

| Key Operation | Letter Display |
|---|---|
| SN/WD | |
| "Z"(L13) | GOOD MORNING. |
| "SRC" | GOOD AFTERNOON. |
| "SRC" | GOOD EVENING. |
| . | . |
| . | . |
| "SRC" | GOOD LUCK. |
| "TRL" | ゴキゲンヨウ。 |
| "SRC" | SEE YOU LATER. |

The SN/WD key 41 is actuated for indicating the mark "▼" specified above the sentence selection mark "SN" and for permitting one of the category keys to be selected. One of the category keys is actuated to select one corresponding category. The first sentence of the selected category is addressed and displayed. The mark specified above the "SN" position is deleted in response to actuation of one of the category keys. The "SRC" Key 42 is actuated to subsequently address the exemplary sentences in the selected category.

When a desired one of the sentences is addressed and indicated, the "TRL" key 43 is actuated to provide translation. The "SRC" key 42 is further actuated to address the next sentence. Therefore, each time the key 42 is operated, further sentences are addressed and displayed. When the "SRC" key 42 is operated in the case of displaying the last sentence of the category, the first sentence in the category is addressed and displayed again.

Any sentence with a word provided within the brackets is addressed and indicated in the same manner as the sentence free of the word within the brackets. Translation of the sentence with a word provided within the brackets is always correct in the grammatical sense so that the indidator 5 does not make the mark "*" illuminated.

F. Entry of a word into a sentence with a word provided within the brackets and translation of the thus modified sentence are conducted as shown in tables 13 through 17. English is the mother tongue and Japanese is the foreign tongue in tables 13, 14 16 and 17. Japanese is the mother tongue and English is the foreign tongue in table 15.

TABLE 15-continued

| NO. | Key Operation | Letter Display |
|---|---|---|
| 6 | "TRL" | (ハナ(ショクブツ)) ハ ドコデ カエマスカ. |

TABLE 16

| No. | Key Operation | Letter Display |
|---|---|---|
| 1 | after access of an exemplary sentence | WHERE CAN I BUY ((A MAP))? |
| 2 | "FLOWEP" | WHERE CAN I BUY ((FLOWEP_))? |
| 3 | "TRL" | WHERE CAN I BUY ((FLOWEP!!))? |
| 4 | "SRC" | WHERE CAN I BUY ((FLOWER!?))? |
| 5 | "TRL" | (ハナ(ショクブツ)) ハ ドコデ カエマスカ'. |

TABLE 17

| No. | Key Operation | Letter Display |
|---|---|---|
| 1 | after access of an exemplary sentence | DOES ((THIS TRAIN)) STOP AT (KYOTO)? |
| 2 | "THAT" "SPC" | DOES ((THAT-)) STOP AT (KYOTO)? |
| 3 | "AIRPLANE" | DOES ((THAT AIRPLAN_)) STOP AT (KYOTO)? |
| 4 | "( )" | DOES ((THAT AIRPLANE!!)) STOP AT (KYOTO)? |
| 5 | "E" | DOES ((THAT AIRPLAN)) STOP AT (KYOTO)? |
| 6 | "( )" | DOES ((THAT AIRPLAN)) STOP AT ((KYOTO))? |
| 7 | "OSAKA" "HLD" | DOES (THAT AIRPLANE) STOP AT ((OSAKA_))? |
| 8 | "TRL" | (アレ(ノ)ヒコウキ) ハ (OSAKA) ニ トマリマスカ. |

TABLE 13

| NO | Key Operation | Letter Display |
|---|---|---|
| 1 | after access of an exemplary sentence | MAY I HAVE ((MILK))? |
| 2 | "C" | MAY I HAVE ((C-))? |
| 3 | "O" | MAY I HAVE ((CO -))? |
| 4 | "F" | MAY I HAVE ((COF-))? |
| 5 | "F" | MAY I HAVE ((COFF-))? |
| 6 | "E" | MAY I HAVE ((COFFE -))? |
| 7 | "E" | MAY I HAVE ((COFFEE-))? |
| 8 | "TRL" | (コーヒー) ヲ クダサイ. |
| 9 | "TRL" | MAY I HAVE ((COFFEE))? |
| 10 | "T" | MAY I HAVE ((T -))? |
| 11 | "E" | MAY I HAVE ((TE-))? |
| 12 | "A" | MAY I HAVE ((TEA-))? |
| 13 | "TRL" | (オチャ) ヲ クダサイ. |

TABLE 14

| No. | Key Operation | Letter Display |
|---|---|---|
| 1 | after access of an exemplary sentence | I WANT ((2)) TICKETS TO (PARIS). |
| 2 | "3" | I WANT ((3_)) TICKETS TO (PARIS). |
| 3 | "( )" | I WANT ((3) TICKETS TO ((PARIS)). |
| 4 | "LONDON" | I WANT ((3) TICKETS TO ((LONDON)). |
| 5 | "TRL" | (ロンドン) ユキ ノ キップ ガ (3) マイ ホシイ. |

TABLE 15

| NO. | Key Operation | Letter Display |
|---|---|---|
| 1 | after access of an exemplary sentence | (チズ) ハ ドコデ カエマスカ. |
| 2 | "ハナ" | (ハナ_) ハ ドコデ カエマスカ. |
| 3 | "TRL" | (ハナ(カオ)!?) ハ ドコデ カエマスカ. |
| 4 | "SRC" | (ハナ(ショクブツ)!?) ハ ドコデ カエマスカ. |
| 5 | "TRL" | WHERE CAN I BUY (FLOWER)? |

Table 13:

The sentence having the word within the brackets is addressed in the manner similar to that described in item E. After access of an exemplary sentence, a word is inputted to delete the word within the double brackets so that the word is replaced by the entered word. When the modified sentence with the double brackets is translated, the double brackets are changed to the single bracket in which no word is inserted into the single bracket.

When the word within the brackets in the original sentence is replaced, inflection at the ends of the entered word is not carried out sometimes causing error in the grammatical sense. To indicate this possibility, the star "*" is indicated in the indicator 5. In table 13, this symbol is illuminated from and after NO. 8.

Table 14:

The number of the brackets to be contained in a sentence is at most two in which the former brackets are represented as double and the latter brackets are represented as a single. In response to actuation of the bracket key 46, the double brackets are changed to the single bracket and the single bracket is changed to the double brackets. Each time this key 46 is operated, the position of the double bracekts is altered. The word contained within the double brackets, whether they are positioned at the former or the latter, can be replaced. At No. 5 in table 14, the star mark is indicated.

Tables 15 and 16:

They are the cases where the entered word to be contained within the double brackets is not found in the mother tongue ROM or the entered word has many translated words. These cases are processed in the same manner as items A and B. The star symbol is illuminated from and after No. 5 in table 15 and illuminated at No. 5 in table 16.

Table 17:

This is an example of retaining an entered word without translation, which can be done automatically or not as those of items C and D. The star symbol is indicated at No. 8 in table 17.

G. Translation of words among three kinds of tongues is accomplished as described in tables 18 and 19.

TABLE 18

| Key Operation | the kind of tongue indication | | |
|---|---|---|---|
| | ENG | GER | JPN |
| "▲▼" | ▼ | ▲ | |
| "▲▼" | ▼ | ▲ | |
| "LNG" | | | ▼ |
| "▲▼" | | ▼ | ▲ |
| "▲▼" | | ▲ | ▼ |
| "LNG" | ▼ | | ▲ |
| "▲▼" | ▲ | | ▼ |
| "▲▼" | ▼ | | ▲ |
| "LNG" | ▲ | ▼ | |
| "▲▼" | ▼ | ▲ | |
| "LNG" | ▲ | ▼ | ▼ |
| "LNG" | ▲ | ▲ | ▲ |
| "LNG" | ▼ | ▲ | |

TABLE 19

| Key Operation | Letter Display | the kind of tongue indication | | |
|---|---|---|---|---|
| | | ENG | GER | JPN |
| after access of an exemplary sentence | MAY I HAVE ((MILK))? | ▲ | | ▼ |
| "COFFEE" | MAY I HAVE ((COFFEE))? | ▲ | | ▼ |
| "TRL" | コーヒー) ヲ クダサイ | ▲ | | ▼ |
| "TRL" | (コーヒー) ヲ クダサイ | | ▼ | ▲ |
| "TRL" | DARF ICH BITTE (KAFFEE) HABEN? | | ▼ | ▲ |
| "LNG" | (コーヒー) ヲ クダサイ | ▼ | | ▲ |

Table 18:

Selection of the mother tongue and the foreign tongue is enabled with the reversing key 48 and the tongue key 49. The mother tongue is specified with the mark " ▲ " and the foreign tongue is specified with the mark " ▼ ".

Table 19:

Translation of a word, a plurality of words and an exemplary sentence among three kinds of tongues is accomplished by combining alternation of the mother tongue and the foreign tongue and the translation operations as described in items A through F.

H. Access of words from the ROM in a category and translation thereof are enabled as shown in tables 20 and 21.

TABLE 20

| Key Operation | Letter Display | Symbol Display |
|---|---|---|
| "SN/WD" | | ▼ SN |
| "SN/WD" | | ▼ WD |
| "c" (L1) | AIRPLANE | |
| "SRC" | INTERNATIONAL | |
| "TRL" | コクサイテキナ | |
| "SRC" | DOMESTIC | |
| . | . | |
| . | . | |
| "SN/WD" | | ▼ SN |
| "SN/WD" | | ▼ WD |

TABLE 20-continued

| Key Operation | Letter Display | Symbol Display |
|---|---|---|
| "T" (L6) | SIGHSEEING | |
| "SRC" | TRIP | |
| "SRC" | TRAVEL | |
| . | . | |
| . | . | |

TABLE 21

| Key Operation | Letter Display | Symbol Display |
|---|---|---|
| "ZOO" | ZOO | |
| "SN/WD" | ZOO | ▼ SN |
| "SN/WD" | ZOO | ▼ WD |
| "SRC" | ZOO | |
| "SRC" | LION | |
| "SRC" | TIGER | |
| "TRL" | トラ | |
| "SRL" | BEAR | |
| . | . | |
| . | . | |

Table 20:

As described above, all the words are classified as 47 categories. The words in the first 14 categories can be addressed in the same manner as the sentences. After translation is enabled with the translation key 43, the search key 42 is operated to address the next word.

Table 21:

Any words belonging to the category to which the presently-entered word belongs can be subsequently addressed.

I. Searching operation for searching any word or words having the same spelling as an entered word is indicated in table 22.

TABLE 22

| Key Operation | Letter Display |
|---|---|
| "STA" | STA |
| "SRC" | STATION (TRAIN)!? |
| "SRC" | STAY (HOTEL)!? |
| "SRC" | STATUE!? |
| "SRC" | STAIRS!? |
| "TRL" | カイダン (イエ) |
| "TRL" | STAIRS!? |
| "SRC" | START!? |
| . | . |
| . | . |
| "SRC" | STAR!? |
| "SRC" | STATION (TRAIN)!? |

As shown in table 22, all the words having the same spelling as that of the entered word are addressed in a ramdom scheme. The homonyms having the same spelling as that of the entered word are addressed in succession. After all the words are addressed, the first word having this type of spelling is accessed. The translation key 43 is depressed to enable translation and is further operated to return to the mother tongue word in which case the search key 42 is operated to enable search operation.

TABLE 23

| Key Operation | Letter Display |
|---|---|
| "STAAAA" | STAAAA_ |
| "SRC" | STAA ◊ |
| | STA ◊ |

TABLE 23-continued

| Key Operation | Letter Display |
| --- | --- |
| | START!? |
| "SRC" | STATION (TRAIN)!? |
| "SRC" | STAY (HOTEL)!? |
| "SRC" | STATUE |

As shown in table 23, the search operation is ultimately conducted for the spelling "STA". "◊" is a mark for representing performance of the search operation. During the search operation, the "C/ON" key 50 is effective to stop the search operation.

As shown in table 23, when the entered word for the search operation consists of four letters or more, only the first four letters are subjected to the search operation so that all the words containing these four letters are to be addressed. If no word is present containing the same four letters as that of the entered word, the number of letters subjected to the search operation is decreased by one for the purpose of the search operation.

The invention being described, it will be obvious that the same may be varied in many ways. Such variations are not to be regarded as a departure from the spirit and scope of the invention, and all such modifications are intended to be included within the scope of the following claims.

What is claimed is:

1. An electronic translator wherein a first word or words in a first language may be entered to obtain a second word or words in a second language equivalent to said first word or words, or wherein a second word or words may be entered to obtain a first word or words equivalent to said second word or words, comprising:

input means for entering one or more first words or one or more second words;

first memory means for storing a plurality of first words in the first language;

second memory means for storing a plurality of second words in the second language equivalent to respective first words in said first memory means;

access means responsive to said input means for addressing one of said first or said second memory means when one or more words are input in the first or second language, respectively, for retrieving the input words;

said access means further addressing the other of said first and second memory means for retrieving the word or words equivalent to the input words;

display means responsive to said input means for displaying the input word or words;

said display means being responsive to said access means for subsequently displaying said retrieved equivalent word or words; and display control means for causing said display means to again display said input word or words corresponding to said retrieved equivalent word or words;

said display control means comprising a first switch means, wherein said display means and said access means are responsive to actuation of said first switch means for displaying said retrieved equivalent word or words subsequent to display of said input words and responsive to further actuation of said first switch means for again displaying said input words.

2. The electronic translator of claim 1, comprising a microcomputer including;

operational instruction means for containing and generating micro-instructions for specific operations of the translator;

address register means coupled to the operational instruction means for causing the operational instruction means to generate the micro-instructions;

central processor means responsive to the micro-instructions for decoding the micro-instructions and conducting specific operations; and data memory means responsive to the central processor means for storing and generating data.

3. The electronic translator of claim 1, further comprising means for holding an input word without translating the held word.

4. The electronic translator of claim 3, wherein said holding means is responsive to actuation of said first switch means for holding a particular input word when said particular input word is not stored in a memory of said translator.

5. The electronic translator of claim 4, further comprising means responsive to a first actuation of said first switch means for displaying a signal in said display means next to a particular input word when said particular input word is not stored in a memory of said translator, said holding means being responsive to a subsequent actuation of said first switch means for holding said particular input word.

6. The electronic translator of claim 3, further comprising second switch means for actuating said holding means.

7. The electronic translator of claim 4, further comprising second switch means, said holding means being also responsive to said second switch means for holding said particular input word.

8. The electronic translator of claim 5, further comprising second switch means, said holding means also being responsive to actuation of said second switch means after first actuation of said first switch means for holding said particular input word.

9. The electronic translator of claim 1, wherein at least one of said memory means stores dummy codes in place of words equivalent to words stored in the other of said memory means.

10. The electronic translator of claim 1, wherein said first memory means stores a plurality of first words in said first language, and said second memory means stores a plurality of second words in said second language corresponding to some of said first words and one or more dummy codes corresponding to other of said first words, such that upon operation of said translator, no data is output representative of second words equivalent to said other first words.

* * * * *